(12) United States Patent
Fu et al.

(10) Patent No.: US 12,501,274 B2
(45) Date of Patent: Dec. 16, 2025

(54) METHOD FOR USING CONFIGURED GRANT RESOURCES, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhe Fu, Guangdong (CN); Jing Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 391 days.

(21) Appl. No.: 18/089,197

(22) Filed: Dec. 27, 2022

(65) Prior Publication Data

US 2023/0129023 A1    Apr. 27, 2023

Related U.S. Application Data

(63) Continuation of application No. PCT/CN2020/111307, filed on Aug. 26, 2020.

(51) Int. Cl.
*H04W 72/04* (2023.01)
*H04L 1/1607* (2023.01)
*H04L 1/1812* (2023.01)
*H04W 16/14* (2009.01)
*H04W 72/044* (2023.01)
*H04W 72/1268* (2023.01)

(52) U.S. Cl.
CPC ........... *H04W 16/14* (2013.01); *H04L 1/1607* (2013.01); *H04L 1/1812* (2013.01); *H04W 72/04* (2013.01); *H04W 72/044* (2013.01); *H04W 72/1268* (2013.01)

(58) Field of Classification Search
CPC ................... H04W 72/044; H04W 72/1268
See application file for complete search history.

(56) References Cited

U.S. PATENT DOCUMENTS

| | | | | |
|---|---|---|---|---|
| 11,297,677 | B2* | 4/2022 | Babaei | H04L 5/0078 |
| 11,432,320 | B2* | 8/2022 | Kunt | H04L 5/0055 |
| 11,558,873 | B2* | 1/2023 | Lin | H04L 1/0003 |
| 2021/0184812 | A1* | 6/2021 | MolavianJazi | H04W 72/044 |
| 2021/0400714 | A1* | 12/2021 | Huang | H04W 72/23 |

(Continued)

FOREIGN PATENT DOCUMENTS

| | | |
|---|---|---|
| CN | 109314627 A | 2/2019 |
| CN | 110830177 A | 2/2020 |

(Continued)

OTHER PUBLICATIONS

3GPP TSG RAN WG1 Meeting#102-e-Meeting, R1-2005433, ZTE, Discussion on unlicensed hand URLLC/IIoT, Aug. 17-28, 2020. (5 pages).

(Continued)

*Primary Examiner* — Raj Jain

(57) ABSTRACT

A method for using configured grant (CG) resources, a terminal device, and a network device are provided in implementations of the disclosure. The method for using CG resources includes the following. In response to reception of downlink feedback information (DFI), for a type-2 CG resource, a terminal device uses the DFI.

15 Claims, 4 Drawing Sheets

(56) References Cited

U.S. PATENT DOCUMENTS

| | | | | |
|---|---|---|---|---|
| 2023/0129023 A1* | 4/2023 | Fu | ............... | H04W 16/14 |
| | | | | 370/329 |
| 2023/0261789 A1* | 8/2023 | Lei | ............... | H04L 1/08 |
| | | | | 370/329 |
| 2024/0188126 A1* | 6/2024 | Babaei | ............... | H04W 16/04 |

FOREIGN PATENT DOCUMENTS

| | | |
|---|---|---|
| CN | 110830179 A | 2/2020 |
| CN | 110958085 A | 4/2020 |
| CN | 111278125 A | 6/2020 |
| WO | 2020006687 A1 | 1/2020 |
| WO | 2020033689 A1 | 2/2020 |
| WO | 2020164128 A1 | 8/2020 |

OTHER PUBLICATIONS

3GPP TSG-RAN WG2 Meeting #106 R2-1905612, OPPO, Enhancements of configured grant in NR-U, Reno, USA, May 13-17, 2019. (4 pages).

3GPP RAN WG2 Meeting #106, R2-1906404, Reno, USA, InterDigital, Configured grant transmission in NR-U, May 13-17, 2019. (5 pages).

Extended European Search Report for EP Application 20950642.7 mailed Apr. 28, 2023. (12 pages).

Huawei, HiSilicon, "Uplink enhancements for URLLC in unlicensed controlled environments", 3GPP TSG RAN WG1 Meeting #102-e E-meeting, R1-2006929, dated Aug. 17-28, 2020, 5 pages.

Chinese Second Office Action with English translation issued in corresponding CN Application No. 202310176462.8 dated Oct. 1, 2024, 23 pages.

ASUSTek, Remaining issues for DFI in NR-U, 3GPP TSG RAN WG1 #102-e, R1-2006866, e-Meeting, Aug. 17-28, 2020, 7 pages.

The First Office Action and English translation issued in corresponding CN Application No. 202310176462.8, dated Jul. 12, 2024, 24 pages.

Communication pursuant to Article 94(3) EPC for EP Application 20950642.7 mailed Aug. 30, 2023. (8 pages).

Qualcomm Inc., New WID on NR-based Access to Unlicensed Spectrum, 3GPP TSG RAN Meeting #82, RP-182878, Dec. 10-13, 2018. (8 pages).

3GPP TR 38.889 V16.0.0 (Dec. 2018); Technical Specification Group Radio Access Network; Study on NR-based access to unlicensed spectrum; (Release 16). (119 pages).

CATT, Enhancements for unlicensed band URLLC/IIoT, 3GPP TSG RAN WG1 #102-e, R1-2005703, Aug. 17-28, 2020. (4 pages).

Moderator (Ericsson), Summary#1 on enhancements for unlicensed band URLLC/IIoT for R17, 3GPP TSG RAN WG1 Meeting #102-e, R1-2007069, Aug. 17-28, 2020. (14 pages).

InterDigital, Inc., Enhancements for unlicensed band URLLC/IIoT, 3GPP TSG RAN WG1 #102-e, R1-2006072, Aug. 17-28, 2020. (4 pages).

International Search Report and Written Opinion with English Translation for PCT Application PCT/CN2020/111307 mailed May 19, 2021. (20 pages).

3GPP TS 38.321 V16.1.0 (Jul. 2020); Technical Specification Group Radio Access Network; NR; Medium Access Control (MAC) protocol specification; (Release 16). (150 pages).

* cited by examiner

METHOD FOR USING CONFIGURED GRANT RESOURCES, TERMINAL DEVICE, AND NETWORK DEVICE

CROSS-REFERENCE TO RELATED APPLICATION(S)

This application is a continuation of International Application No. PCT/CN2020/111307, filed Aug. 26, 2020, the entire disclosure of which is hereby incorporated by reference.

TECHNICAL FIELD

This disclosure relates to the field of communication, and more particularly to a method for using configured grant (CG) resources, a terminal device, and a network device.

BACKGROUND

To support ultra reliability and low latency communication (URLLC) services under an interference-controlled new radio unlicensed (NR-U) scenario, a configured grant (CG) scheduling mode is enhanced by introducing NR-U CG resources and URLLC CG resources. However, how to use NR-U CG resources and URLLC CG resources is an urgent problem to-be-solved.

SUMMARY

A method for using configured grant (CG) resources, a terminal device, and a network device are provided in implementations of the disclosure.

In a first aspect, a method for using CG resources is provided. The method includes the following. In response to reception of downlink feedback information (DFI), for a type-2 CG resource, a terminal device uses the DFI.

In a second aspect, a terminal device is provided. The terminal device includes a processor and a memory storing a computer program which, when executed by the processor, causes the processor to use, for a type-2 CG resource, DFI in response to reception of the DFI.

In a third aspect, a network device is provided. The network device includes a transceiver, a processor, and a memory storing a computer program which, when executed by the processor, causes the transceiver to transmit first information, where the first information indicates: for a type-2 CG resource, a terminal device using DFI in response to reception of the DFI.

DETAILED DESCRIPTION

Figure 1:
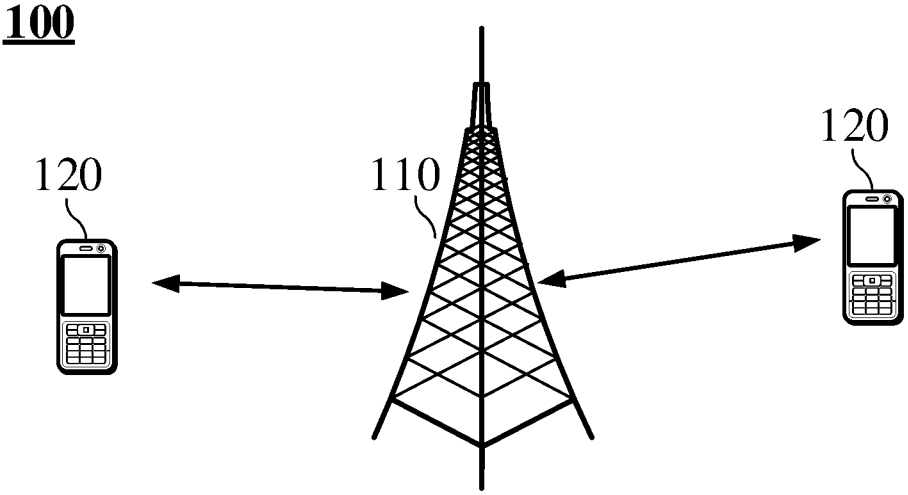
FIG. 1 is a schematic diagram illustrating a communication system architecture provided in implementations of the disclosure.

The following will illustrate technical solutions of implementations of the disclosure with reference to the accompanying drawings of implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

The technical solutions in implementations of the disclosure can be applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (Wi-Fi), a $5^{th}$-generation (5G) system, or other communication systems.

Generally speaking, a conventional communication system supports a limited number of connections and therefore is easy to implement. However, with development of communication technology, a mobile communication system not only supports conventional communication but also supports, for example, device to device (D2D) communication, machine to machine (M2M) communication, machine type communication (MTC), and vehicle to vehicle (V2V) communication. Implementations herein can also be applicable to these communication systems.

Optionally, a communication system in implementations of the disclosure can be applicable to a carrier aggregation (CA) scenario, a dual connectivity (DC) scenario, and a stand-alone (SA) scenario.

Optionally, the communication system in implementations of the disclosure can be applicable to an unlicensed spectrum, where the unlicensed spectrum can also be regarded as a shared spectrum. Alternatively, the communication system in implementations of the disclosure can also be applicable to a licensed spectrum, where the licensed spectrum can also be regarded as an unshared spectrum.

In implementations of the disclosure, each implementation is illustrated in conjunction with a network device and a terminal device, where the terminal device may also be called a user equipment (UE), an access terminal, a subscriber unit, a subscriber station, a mobile station, a mobile platform, a remote station, a remote terminal, a mobile device, a user terminal, a terminal, a wireless communication device, a user agent, a user apparatus, etc.

The terminal device may also be a station (ST) in the WLAN, a cellular radio telephone, a cordless telephone, a session initiation protocol (SIP) telephone, a wireless local loop (WLL) station, a personal digital assistant (PDA). The terminal device may also be a device with wireless communication functions such as a handheld device, a computing device, other processing devices coupled with a wireless modem, an in-vehicle device, a wearable device, or a terminal device in a next-generation communication system such as an NR network, a terminal device in a future evolved public land mobile network (PLMN), etc.

In implementations of the disclosure, the terminal device can be deployed on land, including indoor or outdoor, handheld, wearable, or vehicle-mounted; on water (e.g., a ship); and also in the air (e.g., an aircraft, a balloon, and a satellite).

In implementations of the disclosure, the terminal device may be a mobile phone, a pad, a computer with wireless transceiving functions, a terminal device for virtual reality (VR), a terminal device for augmented reality (AR), a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, etc.

As an example but not limitation, in implementations of the disclosure, the terminal device may also be a wearable device. The wearable device can also be called a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets and smart jewelry for physical sign monitoring or the like.

In implementations of the disclosure, the network device may be a device that is used to communicate with a mobile device. The network device may be an access point (AP) in the WLAN, a base transceiver station (BTS) in the GSM or CDMA system, a NodeB (NB) in the WCDMA system, or an evolved NodeB (eNB or eNodeB) in the LTE system. Alternatively, the network device may also be a relay station, an AP, an in-vehicle device, a wearable device, a network device or a generation NodeB (gNB) in the NR network, a network device in the future evolved PLMN, or a network device in the NTN network.

As an example but not limitation, in implementations of the disclosure, the network device can have a mobility, e.g., the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, or the like. Alternatively, the network device may also be a base station deployed on land, on water, or on other locations.

In implementations of the disclosure, the network device can provide a service for a cell, and the terminal device can communicate with the network device through transmission resources (e.g., frequency-domain resources or spectrum resources) for the cell, where the cell may be a cell corresponding to the network device (e.g., a base station). The cell may belong to a macro base station or a base station corresponding to a small cell, where the small cell may include a metro cell, a micro cell, a pico cell, a femto cell, or the like. These small cells have features of small coverage ranges and low transmission power and are suitable for providing high-speed data transmission services.

Exemplarily, a communication system 100 applied in implementations of the disclosure is illustrated in FIG. 1. The communication system 100 may include a network device 110, where the network device 110 can communicate with a terminal device 120 (or called a communication terminal or a terminal). The network device 110 can provide communication coverage for a specific geographical area and can communicate with terminal devices in the coverage range.

FIG. 1 exemplarily illustrates a network device and two terminal devices. Optionally, the communication system 100 may include multiple network devices, and the other number of terminal devices may be included in a coverage range of each of the multiple network devices, which will not be limited in implementations of the disclosure.

Optionally, the communication system 100 may further include a network controller, a mobility management entity (MME), or other network entities, which will not be limited in implementations of the disclosure.

It can be understood that, a device with a communication function in a network/system in implementations of the disclosure can be called a communication device. Taking the communication system 100 illustrated in FIG. 1 as an example, communication devices may include the network device 110 and the terminal device 120 that have communication functions, and the network device 110 and the terminal device 120 may be the above-mentioned devices, which will not be repeated herein. The communication devices may further include other devices in the communication system 100, e.g., a network controller, an MME, or other network entities, which will not be limited in implementations of the disclosure.

It can be understood that, the terms "system" and "network" in this disclosure are often used interchangeably. The term "and/or" in this disclosure is simply an illustration of an association relationship of associated objects, indicating that three relationships may exist, for example, A and/or B, which may indicate the existence of A alone, A and B together, and B alone. In addition, the character "/" in this disclosure generally indicates that associated objects are in an "or" relationship.

The terms used in implementations of the disclosure are only for the purpose of explaining specific implementations of the disclosure rather than limiting the disclosure. The terms "first", "second", "third", "fourth", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion.

It can be understood that, the "indication" referred to in implementations of the disclosure may be a direct indication, an indirect indication, or an indication indicating an associated relation. For example, A indicates B, which can mean that A indicates B directly, e.g., B can be obtained through A, can also mean that A indicates B indirectly, e.g., A indicates C, and B can be obtained through C, or can further mean that A and B have an associated relation.

In illustration of implementations of the disclosure, the term "correspondence" may represent a direct correspondence or indirect correspondence between the two, may also represent an associated relation between the two, or may further represent a relation of indicating and being indicated, a relation of configuring and being configured, or other relations.

In 5G radio access network (RAN) 2 ultra reliability and low latency communication (URLLC), it is required to support transmission of services in a 5G system, such as factory automation, transport industry, or electrical power distribution. For supporting transmission of URLLC services, a configured grant (CG) is enhanced, i.e., multiple CG configurations are introduced, and specific CG configurations and CG usage are enhanced (e.g., supporting a slot-level period, supporting autonomous transmission on the CG, etc.).

In release 17 (Rel-17), it is required to consider supporting of URLLC services under an interference-controlled NR-U scenario. Specifically, manners for using NR-U CG enhancements and URLLC CG enhancements can be considered under an NR-U scenario.

For meeting high-latency requirements of URLLC services, a CG period is enhanced in URLLC, to support any slot-level service period.

For supporting multiple kinds of URLLC services and meeting high-latency requirements of URLLC services, multiple CGs are introduced in URLLC. Different CGs are configured with different hybrid automatic repeat request (HARQ) processes, and by means of a harq-ProcID-Offset2 field, it can be ensured that different CGs are configured with different processes.

In the case of conflicts between a CG resource and other resources, to ensure that an assembled medium access control protocol data unit (MAC PDU) (i.e., a deprioritized MAC PDU) on the CG resource will not be discarded/will be transmitted as soon as possible, autonomous transmission on a CG is introduced. For the assembled MAC PDU on the CG resource that cannot be transmitted due to resource conflicts, new transmission can be performed by using a subsequent CG resource with the same HARQ process in the same CG configuration. It is determined to use autonomous transmission through an antonomousTx field.

It needs to be noted that, the following are several operating scenarios in NR-U.

Scenario A: a CA scenario, in which a primary cell (PCell) operates in a licensed spectrum, and aggregates through CA secondary cells (SCells) operating in an unlicensed spectrum.

Scenario B: a DC operating scenario, in which a PCell operates in an LTE licensed spectrum, and a primary secondary cell (PSCell) operates in an NR unlicensed spectrum.

Scenario C: an SA operating scenario, in which an NR cell serves as an SA cell that operates in an unlicensed spectrum.

Scenario D: a single NR cell scenario, in which uplink (UL) operates in a licensed spectrum, and downlink (DL) operates in an unlicensed spectrum.

Scenario E: a DC operating scenario, in which a PCell operates in an NR licensed spectrum, and a PSCell operates in an NR unlicensed spectrum.

Generally, NR-U operating frequency band includes a 5 gigahertz (GHz) unlicensed spectrum and a 6 GHz unlicensed spectrum. NR-U design applicable to these unlicensed spectrums needs to ensure a fairness between NR-U and systems (e.g., Wi-Fi) that have already operated in these unlicensed spectrums. A fairness principle is that an impact of NR-U on the systems already deployed in the unlicensed spectrums cannot be greater than an impact generated between these systems.

For ensuring fair coexistence of the systems in the unlicensed spectrum, energy detection has been agreed as a basic coexistence mechanism. Generally, an energy detection mechanism is a listen before talk (LBT) mechanism, where a basic principle of the mechanism is that a base station or a terminal device (a transmitter) needs to sense a channel for a duration of time first before the base station or the terminal device (the transmitter) performs data transmission in the unlicensed spectrum, according to regulations. If the channel is sensed to be idle, the transmitter can transmit data to a receiver. If the channel is sensed to be occupied, the transmitter needs to back off for a duration of time and then further senses the channel according to regulations, and the transmitter can transmit data to the receiver until the channel is sensed to be idle.

The following four channel access categories are defined in NR-U.

Category 1: Category 1 is an immediate transmission category.

In the category, a transmitter can immediately perform transmission after a switching gap in a channel occupancy time (COT).

The switching gap refers to a switching time from reception to transmission and is typically no longer than 16 μs.

Category 2: Category 2 is an LBT category without random back-off.

In the category, a duration of time for the terminal device to sense a channel is fixed, which often is relatively short, e.g., 25 μs.

Category 3: Category 3 is an LBT category with random back-off (a contention window of a fixed size).

In an LBT procedure, the transmitter randomly draws a random number within the contention window to determine a duration of time for channel sensing.

Category 4: Category 4 is an LBT category with random back-off (a contention window of a variable size).

In an LBT procedure, the transmitter randomly draws a random number within the contention window to determine a duration of time for channel sensing, where the contention window has a variable size.

To sum up, for the terminal device, data transmission form the base station to the terminal device is required to be performed within a maximum channel occupancy time (MCOT), and if the base station fails to occupy a channel, i.e., the base station performs data transmission outside the MCOT, the terminal device cannot receive scheduling data transmitted by the base station.

UL transmission initiated by the terminal device mainly includes the following categories.

Scheduling request (SR): the SR is used to request a UL resource.

Physical random access channel (PRACH) transmission: when a random access channel (RACH) is triggered, the terminal device needs to transmit message 1 (Msg 1) in a 4-step random access (RA).

Physical uplink shared channel (PUSCH) transmission: the PUSCH transmission includes CG-based UL data transmission and dynamic grant (DG)-based UL data transmission.

Physical-layer signaling transmission: the physical-layer signaling transmission includes acknowledgement (ACK)/negative acknowledgement (NACK) feedback, channel state information (CSI) reporting, etc.

In an unlicensed frequency band, the terminal device needs to sense whether a channel is available through LBT before the terminal device transmits an SR, a PRACH, or a PUSCH. If the channel is occupied, i.e., LBT failure, the terminal device needs to perform LBT again to wait for a next transmission occasion. If LBT failure is detected, LBT failure is required to be informed to an MAC layer.

For flexible resource selection, an HARQ process for an NR-U CG is not calculated according to a formula but selected by the terminal device. A CG resource is configured with a set of HARQ processes through radio resource control (RRC), and the terminal device can select an HARQ process from the set for this CG transmission. An HARQ process range specifically configured is determined according to a harq-ProcID-Offset field and an nrofHARQ-Processes field.

Multiple CGs are introduced in NR-U. Multiple CG configurations can share an HARQ process.

A CG retransmission timer is introduced to support resource autonomous retransmission when a CG resource cannot be transmitted due to LBT failure. After the CG retransmission timer expires, if a CG timer does not expire, a corresponding HARQ process can be retransmitted.

CG transmission can be interrupted by dynamically scheduled downlink control information (DCI) and downlink feedback information (DFI), which is specifically illustrated in Table 1.

TABLE 1

|  | DFI = ACK | DFI = NACK | DCI = new transmission | DCI = retransmission | CG timer expires |
|---|---|---|---|---|---|
| CG timer | stop | no impact | start/restart | start/restart | none |
| CG retransmission timer | stop | stop | stop | stop | stop |

It needs to be noted that, in Table 1, DFI=ACK indicates that DFI indicates ACK, DFI=NACK indicates that DFI indicates NACK, DCI=new transmission indicates that DCI indicates new transmission, and DCI=retransmission indicates that DCI indicates retransmission.

To support URLLC services under an interference-controlled NR-U scenario, a CG scheduling mode is enhanced by introducing an NR-U CG resource and a URLLC CG resource. However, how to reasonably use the NR-U CG resource and the URLLC CG resource and how to use DFI by the terminal device under a scenario where the NR-U CG resource and the URLLC CG resource are coexisted are urgent problems to-be-solved.

Based on the above problems, a solution for using CG resources is proposed in the disclosure. In response to reception of DFI, for a URLLC CG resource, the terminal device ignores the DFI; and/or, for an NR-U CG resource, the terminal device uses the DFI. As such, the terminal device can reasonably use the DFI under a scenario where the NR-U CG resource and the URLLC CG resource are coexisted, thereby improving communication performance.

The following will illustrate in detail technical solutions of the disclosure through specific implementations.

Figure 2:
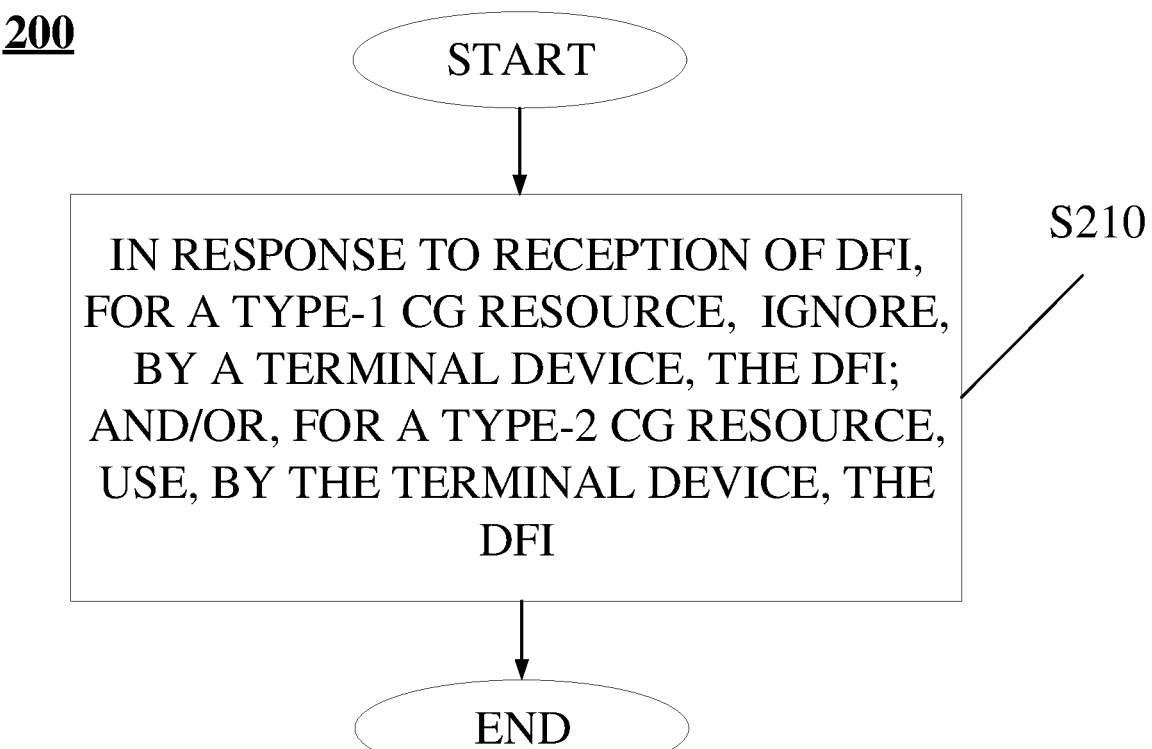
FIG. 2 is a schematic flow chart illustrating a method for using configured grant (CG) resources according to implementations of the disclosure.

FIG. 2 is a schematic flow chart illustrating a method 200 for using CG resources according to implementations of the disclosure. As illustrated in FIG. 2, the method 200 includes at least part of the following.

At S210, in response to reception of DFI, for a type-1 CG resource, a terminal device ignores the DFI; and/or, for a type-2 CG resource, the terminal device uses the DFI.

Optionally, the type-1 CG resource is a URLLC CG resource, and the type-2 CG resource is an NR-U CG resource.

Optionally, the type-1 CG resource is a CG resource configured by using a resource configuration mode used for CG resource configuration in a licensed spectrum or a URLLC CG resource configured by using the resource configuration mode used for CG resource configuration in the licensed spectrum. The type-2 CG resource is a CG resource configured by using a resource configuration mode used for CG resource configuration in an unlicensed spectrum.

Optionally, the type-1 CG resource is a CG resource configured by using a resource configuration mode used for CG resource configuration in a licensed spectrum in release 16 (Rel-16) or a URLLC CG resource configured by using the resource configuration mode used for CG resource configuration in the licensed spectrum in Rel-16. The type-2 CG resource is a CG resource configured by using a resource configuration mode used for CG resource configuration in an unlicensed spectrum in Rel-16.

The type-1 CG resource may also be other types of CG resources, and the type-2 CG resource may also be other types of CG resources, which is not limited in implementations of the disclosure.

In implementations of the disclosure, the terminal device using the DFI can be understood as follows. The terminal device can perform transmission on the NR-U CG resource according to an indication of the DFI. Alternatively, the terminal device can perform transmission by using the NR-U CG resource according to the indication of the DFI. For example, as illustrated in Table 1, according to the indication of the DFI, the CG timer and the CG retransmission timer may respectively make a corresponding response, to control transmission on the NR-U CG resource.

Optionally, the terminal device receives the DFI transmitted by a network device.

Optionally, in some implementations, the terminal device determines a type of a first CG resource according to first parameter information, where the first parameter information includes at least one of: a type-1 CG resource indication, a type-2 CG resource indication, or a CG retransmission timer.

Optionally, the first CG resource belongs to at least one CG resource configured by the network device. For example, the network device pre-configures the at least one CG resource.

It needs to be noted that, the first CG resource may be any one of the at least one CG resource.

Optionally, a CG resource in an unlicensed frequency point is configured with the first parameter information. Alternatively, the CG resource in the unlicensed frequency point is not configured with the first parameter information.

That is to say, the network device can configure the first parameter information for the CG resource in the unlicensed frequency point or does not configure the first parameter information for the CG resource in the unlicensed frequency point.

Optionally, on condition that one of at least one CG resource is configured with the first parameter information, the rest of the at least one CG resource is also configured with the first parameter information. For example, the network device configures the first parameter information for the CG resource through RRC configuration information, or the network device pre-configures the first parameter information. It needs to be noted that, the at least one CG resource can share one piece of first parameter information, or each of the at least one CG resource is configured with its own first parameter information.

Optionally, on condition that one of at least one CG resource is configured with the first parameter information, the rest of the at least one CG resource is also configured with the first parameter information by default or can use the first parameter information.

Optionally, the terminal device can determine the type of the first CG resource according to at least one of the following. The terminal device determines that the type of the first CG resource is the type-2 CG resource on condition that the first parameter information includes the CG retransmission timer. The terminal device determines that the type of the first CG resource is the type-1 CG resource on condition that the first parameter information includes no CG retransmission timer. The terminal device determines that the type of the first CG resource is the type-1 CG resource on condition that the first parameter information includes the type-1 CG resource indication. The terminal device determines that the type of the first CG resource is the type-2 CG resource on condition that the first parameter information includes no type-1 CG resource indication. The terminal device determines that the type of the first CG resource is the type-2 CG resource on condition that the first parameter information includes the type-2 CG resource indication. The terminal device determines that the type of the first CG resource is the type-1 CG resource on condition that the first parameter information includes no type-2 CG resource indication.

Optionally, in implementations of the disclosure, the terminal device receives first configuration information transmitted by the network device, where the first configuration information is used to configure: both the type-1 CG resource and the type-2 CG resource, the type-1 CG resource, or the type-2 CG resource.

That is to say, the network device can configure both the NR-U CG resource and the URLLC CG resource for the terminal device, configure only the URLLC CG resource for the terminal device, or configure only the NR-U CG resource for the terminal device.

Optionally, in implementations of the disclosure, the terminal device receives a first indication transmitted by the network device, where the first indication indicates one of the following. The terminal device activates or uses the type-1 CG resource configured and the type-2 CG resource configured. The terminal device activates or uses the type-1 CG resource configured. The terminal device activates or uses the type-2 CG resource configured.

That is to say, the network device can indicate the terminal device to activate or use both the NR-U CG resource configured and the URLLC CG resource configured, activate or use only the URLLC CG resource configured, or activate or use only the NR-U CG resource configured.

Optionally, the first indication may be physical-layer signaling, e.g., at least one of DCI, system information (SI), RRC signaling, or an MAC control element (CE).

In addition, the first indication may be higher-layer signaling, e.g., at least one of RRC signaling or an MAC CE.

Optionally, in implementations of the disclosure, the terminal device receives a second indication transmitted by the network device, where the second indication indicates: both a scheme in which the terminal device activates or uses the type-1 CG resource configured and a scheme in which the terminal device activates or uses the type-2 CG resource configured, the scheme in which the terminal device activates or uses the type-1 CG resource configured, or the scheme in which the terminal device activates or uses the type-2 CG resource configured.

That is to say, the network device can indicate to the terminal device both the scheme in which the terminal device activates or uses the NR-U CG resource configured and the scheme in which the terminal device activates or uses the URLLC CG resource configured, the scheme in which the terminal device activates or uses the URLLC CG resource configured, or the scheme in which the terminal device activates or uses the NR-U CG resource configured.

Optionally, in some implementations, the DFI is an ACK/NACK indication of all HARQ processes for a carrier, the DFI is an ACK/NACK indication of a CG HARQ process for a carrier, the DFI is an ACK/NACK indication of all HARQ processes, the DFI is an ACK/NACK indication of a CG HARQ process, the DFI is an ACK/NACK indication of an HARQ process for the type-2 CG resource, or the DFI is an ACK/NACK indication of an HARQ process for the type-2 CG resource for a carrier.

Optionally, in some implementations, the terminal device receives first information transmitted by the network device, where the first information indicates at least one of: for the type-1 CG resource, the terminal device ignoring the DFI in response to reception of the DFI; or for the type-2 CG resource, the terminal device using the DFI in response to reception of the DFI.

That is to say, in implementations of the disclosure, the terminal device can perform the operation at S210 according to the first information.

It needs to be noted that, in implementations of the disclosure, at least one of the first information, the first configuration information, the first indication, or the second indication may be physical-layer signaling, e.g., at least one of DCI, SI, RRC signaling, or an MAC CE.

In addition, at least one of the first information, the first configuration information, the first indication, or the second indication may also be higher-layer signaling, e.g., at least one of RRC signaling or an MAC CE.

Therefore, in implementations of the disclosure, in response to reception of the DFI, for the URLLC CG resource, the terminal device ignores the DFI; and/or, for the NR-U CG resource, the terminal device uses the DFI. As such, under a scenario where the NR-U CG resource and the URLLC CG resource are coexisted, the terminal device can reasonably use the DFI, thereby improving communication performance. Furthermore, it can be ensured that the terminal device and the network device understand the DFI in the same way.

Figure 3:
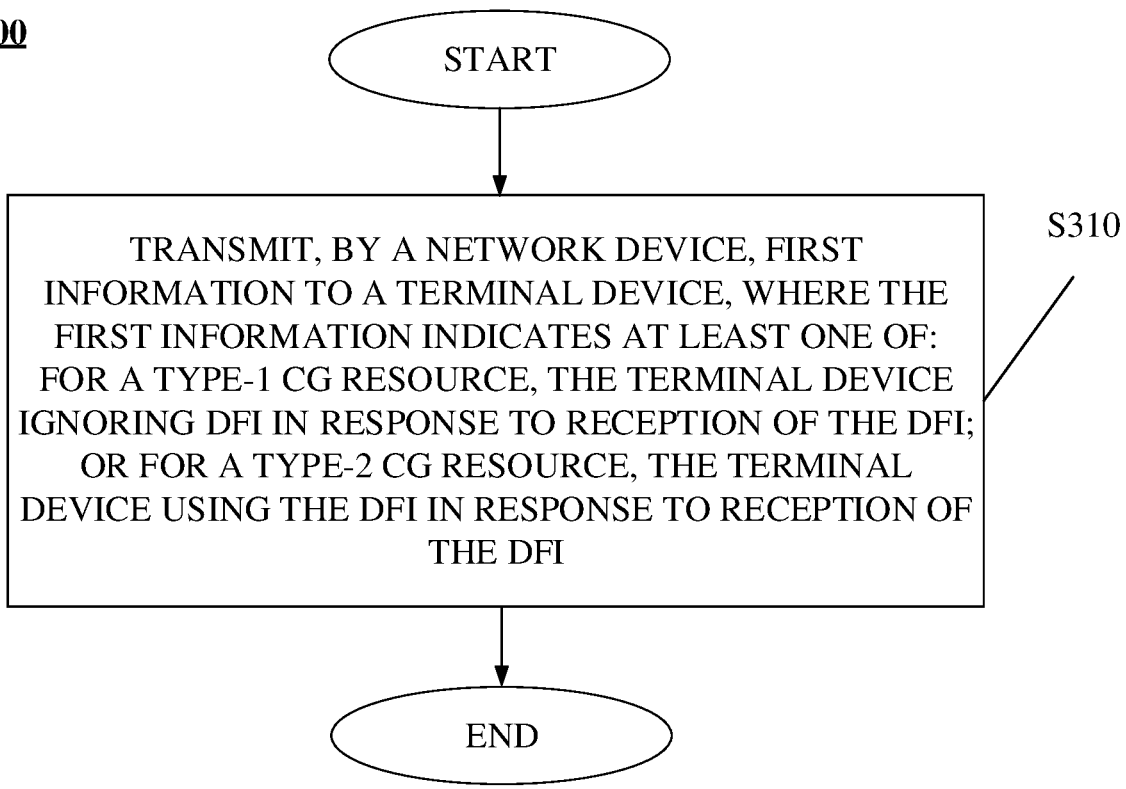
FIG. 3 is another schematic flow chart illustrating a method for using CG resources according to implementations of the disclosure.

The above illustrates in detail the terminal-side implementations of the disclosure with reference to FIG. 2, and the following will illustrate in detail network-side implementations of the disclosure with reference to FIG. 3. It can be understood that, the network-side implementations correspond to the terminal-side implementations, and for similar illustrations, reference can be made to the terminal-side implementations.

FIG. 3 is another schematic flow chart illustrating a method 300 for using CG resources according to implementations of the disclosure. As illustrated in FIG. 3, the method 300 includes at least part of the following.

At S310, a network device transmits first information to a terminal device, where the first information indicates at least one of: for a type-1 CG resource, the terminal device ignoring DFI in response to reception of the DFI; or for a type-2 CG resource, the terminal device using the DFI in response to reception of the DFI.

In implementations of the disclosure, in response to reception of the DFI by the terminal device, for the type-1 CG resource, the terminal device ignores the DFI according to the first information; and/or, for the type-2 CG resource, the terminal device uses the DFI according to the first information.

Optionally, the type-1 CG resource is a URLLC CG resource, and the type-2 CG resource is an NR-U CG resource.

Optionally, the type-1 CG resource is a CG resource configured by using a resource configuration mode used for CG resource configuration in a licensed spectrum or a URLLC CG resource configured by using the resource configuration mode used for CG resource configuration in the licensed spectrum. The type-2 CG resource is a CG resource configured by using a resource configuration mode used for CG resource configuration in an unlicensed spectrum.

Optionally, the type-1 CG resource is a CG resource configured by using a resource configuration mode used for CG resource configuration in a licensed spectrum in Rel-16 or a URLLC CG resource configured by using the resource configuration mode used for CG resource configuration in the licensed spectrum in Rel-16. The type-2 CG resource is a CG resource configured by using a resource configuration mode used for CG resource configuration in an unlicensed spectrum in Rel-16.

The type-1 CG resource may also be other types of CG resources, and the type-2 CG resource may also be other types of CG resources, which is not limited in implementations of the disclosure.

It needs to be noted that, the terminal device using the DFI can be understood as follows. The terminal device can perform transmission on the NR-U CG resource according to an indication of the DFI. Alternatively, the terminal device can perform transmission by using the NR-U CG resource according to the indication of the DFI. For example, as illustrated in Table 1, according to the indication of the DFI, the CG timer and the CG retransmission timer may respectively make a corresponding response, to control transmission on the NR-U CG resource.

Optionally, the network device transmits the DFI to the terminal device.

Optionally, in some implementations, the network device transmits second information to the terminal device, where the second information is used to configure first parameter information, and the first parameter information is used to determine a type of a first CG resource. The first parameter information includes at least one of: a type-1 CG resource indication, a type-2 CG resource indication, or a CG retransmission timer.

Optionally, the first CG resource belongs to at least one CG resource configured by the network device. For example, the network device pre-configures the at least one CG resource.

It needs to be noted that, the first CG resource may be any one of the at least one CG resource.

Optionally, a CG resource in an unlicensed frequency point is configured with the first parameter information. Alternatively, the CG resource in the unlicensed frequency point is not configured with the first parameter information.

That is to say, the network device can configure the first parameter information for the CG resource in the unlicensed frequency point, or does not configure the first parameter information for the CG resource in the unlicensed frequency point.

Optionally, on condition that one of at least one CG resource is configured with the first parameter information, the rest of the at least one CG resource is also configured with the first parameter information. For example, the network device configures the first parameter information for the CG resource through RRC configuration information, or the network device pre-configures the first parameter information. It needs to be noted that, the at least one CG resource can share one piece of first parameter information, or each of the at least one CG resource is configured with its own first parameter information.

Optionally, on condition that one of at least one CG resource is configured with the first parameter information, the rest of the at least one CG resource is also configured with the first parameter information by default or can use the first parameter information.

Optionally, the first parameter information being used to determine the type of the first CG resource includes at least one of the following. The first parameter information is used to determine that the type of the first CG resource is the type-2 CG resource on condition that the first parameter information includes the CG retransmission timer. The first parameter information is used to determine that the type of the first CG resource is the type-1 CG resource on condition that the first parameter information includes no CG retransmission timer. The first parameter information is used to determine that the type of the first CG resource is the type-1 CG resource on condition that the first parameter information includes the type-1 CG resource indication. The first parameter information is used to determine that the type of the first CG resource is the type-2 CG resource on condition that the first parameter information includes no type-1 CG resource indication. The first parameter information is used to determine that the type of the first CG resource is the type-2 CG resource on condition that the first parameter information includes the type-2 CG resource indication. The first parameter information is used to determine that the type of the first CG resource is the type-1 CG resource on condition that the first parameter information includes no type-2 CG resource indication.

Optionally, the network device transmits first configuration information, where the first configuration information is used to configure: both the type-1 CG resource and the type-2 CG resource, the type-1 CG resource, or the type-2 CG resource.

That is to say, the network device can configure both the NR-U CG resource and the URLLC CG resource for the terminal device, configure only the URLLC CG resource for the terminal device, or configure only the NR-U CG resource for the terminal device.

Optionally, the network device transmits a first indication, where the first indication indicates one of the following. The terminal device activates or uses the type-1 CG resource configured and the type-2 CG resource configured. The terminal device activates or uses the type-1 CG resource configured. The terminal device activates or uses the type-2 CG resource configured.

That is to say, the network device can indicate the terminal device to activate or use both the NR-U CG resource configured and the URLLC CG resource configured, activate or use only the URLLC CG resource configured, or activate or use only the NR-U CG resource configured.

Optionally, the network device transmits a second indication, where the second indication indicates: both a scheme in which the terminal device activates or uses the type-1 CG resource configured and a scheme in which the terminal device activates or uses the type-2 CG resource configured, the scheme in which the terminal device activates or uses the type-1 CG resource configured, or the scheme in which the terminal device activates or uses the type-2 CG resource configured.

That is to say, the network device can indicate to the terminal device both the scheme in which the terminal device activates or uses the NR-U CG resource configured and the scheme in which the terminal device activates or uses the URLLC CG resource configured, the scheme in which the terminal device activates or uses the URLLC CG resource configured, or the scheme in which the terminal device activates or uses the NR-U CG resource configured.

Optionally, in implementations of the disclosure, the DFI is an ACK/NACK indication of all HARQ processes for a carrier, the DFI is an ACK/NACK indication of a CG HARQ process for a carrier, the DFI is an ACK/NACK indication of all HARQ processes, the DFI is an ACK/NACK indication of a CG HARQ process, the DFI is an ACK/NACK indication of an HARQ process for the type-2 CG resource, or the DFI is an ACK/NACK indication of an HARQ process for the type-2 CG resource for a carrier.

It needs to be noted that, in implementations of the disclosure, at least one of the first information, the second information, the first configuration information, the first indication, or the second indication may be physical-layer signaling, e.g., at least one of DCI, SI, RRC signaling, or an MAC CE.

In addition, at least one of the first information, the second information, the first configuration information, the first indication, or the second indication may also be higher-layer signaling, e.g., at least one of RRC signaling or an MAC CE.

Therefore, in implementations of the disclosure, under a scenario where the NR-U CG resource and the URLLC CG resource are coexisted, the network device can indicate the terminal device how to process the DFI received. Specifically, in response to reception of the DFI, for the URLLC CG resource, the terminal device ignores the DFI; and/or, for the NR-U CG resource, the terminal device uses the DFI. As such, under the scenario where the NR-U CG resource and the URLLC CG resource are coexisted, the terminal device can reasonably use the DFI, thereby improving communication performance. Furthermore, it can be ensured that the terminal device and the network device understand the DFI in the same way.

The above illustrates in detail the method implementations of the disclosure with reference to FIG. 2 and FIG. 3, and the following will illustrate in detail apparatus implementations of the disclosure with reference to FIG. 4 to FIG. 8. It can be understood that, the apparatus implementations correspond to the method implementations, and for similar illustrations, reference can be made to the terminal-side implementations.

Figure 4:
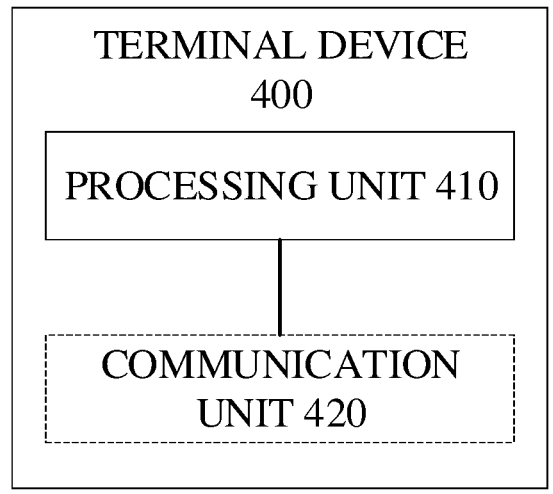
FIG. 4 is a schematic block diagram illustrating a terminal device according to implementations of the disclosure.

FIG. 4 is a schematic block diagram illustrating a terminal device 400 according to implementations of the disclosure. As illustrated in FIG. 4, the terminal device 400 includes a processing unit 410. The processing unit 410 is configured to ignore, for a type-1 CG resource, DFI in response to reception of the DFI, and/or use, for a type-2 CG resource, the DFI in response to reception of the DFI.

Optionally, the processing unit 410 is further configured to determine a type of a first CG resource according to first parameter information, where the first parameter information includes at least one of: a type-1 CG resource indication, a type-2 CG resource indication, or a CG retransmission timer.

Optionally, the processing unit 410 determining the type of the first CG resource according to the first parameter information includes at least one of the following. The processing unit 410 determines that the type of the first CG resource is the type-2 CG resource on condition that the first parameter information includes the CG retransmission timer. The processing unit 410 determines that the type of the first CG resource is the type-1 CG resource on condition that the first parameter information includes no CG retransmission timer. The processing unit 410 determines that the type of the first CG resource is the type-1 CG resource on condition that the first parameter information includes the type-1 CG resource indication. The processing unit 410 determines that the type of the first CG resource is the type-2 CG resource on condition that the first parameter information includes no type-1 CG resource indication. The processing unit 410 determines that the type of the first CG resource is the type-2 CG resource on condition that the first parameter information includes the type-2 CG resource indication. The processing unit 410 determines that the type of the first CG resource is the type-1 CG resource on condition that the first parameter information includes no type-2 CG resource indication.

Optionally, a CG resource in an unlicensed frequency point is configured with the first parameter information. Alternatively, the CG resource in the unlicensed frequency point is not configured with the first parameter information.

Optionally, on condition that one of at least one CG resource is configured with the first parameter information, the rest of the at least one CG resource is also configured with the first parameter information.

Optionally, on condition that one of at least one CG resource is configured with the first parameter information, the rest of the at least one CG resource is also configured with the first parameter information by default or can use the first parameter information.

Optionally, the first CG resource belongs to at least one CG resource configured by a network device.

Optionally, the terminal device 400 further includes a communication unit 420. The communication unit 420 is configured to receive first configuration information, where the first configuration information is used to configure: both the type-1 CG resource and the type-2 CG resource, the type-1 CG resource, or the type-2 CG resource.

Optionally, the terminal device 400 further includes a communication unit 420. The communication unit 420 is configured to receive a first indication, where the first indication indicates one of the following. The terminal device activates or uses the type-1 CG resource configured and the type-2 CG resource configured. The terminal device activates or uses the type-1 CG resource configured. The terminal device activates or uses the type-2 CG resource configured.

Optionally, the terminal device 400 further includes a communication unit 420. The communication unit 420 is configured to receive a second indication, where the second indication indicates: both a scheme in which the terminal device activates or uses the type-1 CG resource configured and a scheme in which the terminal device activates or uses the type-2 CG resource configured, the scheme in which the terminal device activates or uses the type-1 CG resource configured, or the scheme in which the terminal device activates or uses the type-2 CG resource configured.

Optionally, the DFI is an ACK/NACK indication of all HARQ processes for a carrier, the DFI is an ACK/NACK indication of a CG HARQ process for a carrier, the DFI is an ACK/NACK indication of all HARQ processes, the DFI is an ACK/NACK indication of a CG HARQ process, the DFI is an ACK/NACK indication of an HARQ process for the type-2 CG resource, or the DFI is an ACK/NACK indication of an HARQ process for the type-2 CG resource for a carrier.

Optionally, the terminal device 400 further includes a communication unit 420. The communication unit 420 is configured to receive first information, where the first information indicates at least one of: for the type-1 CG resource, the terminal device ignoring the DFI in response to reception of the DFI; or for the type-2 CG resource, the terminal device using the DFI in response to reception of the DFI.

Optionally, the type-1 CG resource is a URLLC CG resource, and the type-2 CG resource is an NR-U CG resource.

Optionally, in some implementations, the communication unit may be a communication interface or a transceiver, or an input/output interface of a communication chip or a system on a chip (SOC). The processing unit may be one or more processors.

It can be understood that, according to implementations of the disclosure, the terminal device 400 can correspond to the terminal device in the method implementations of the disclosure, and the above-mentioned and other operations and/or functions of each unit in the terminal device 400 respectively implement a corresponding procedure performed by the terminal device in the method 200 illustrated in FIG. 2, which will not be repeated herein for sake of simplicity.

Figure 5:
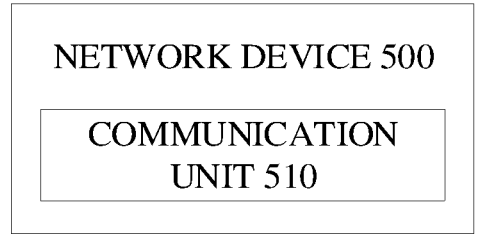
FIG. 5 is a schematic block diagram illustrating a network device according to implementations of the disclosure.

FIG. 5 is a schematic block diagram illustrating a network device 500 according to implementations of the disclosure. As illustrated in FIG. 5, the network device 500 includes a communication unit 510. The communication unit 510 is configured to transmit first information, where the first information indicates at least one of: for a type-1 CG resource, a terminal device ignoring DFI in response to reception of the DFI; or for a type-2 CG resource, the terminal device using the DFI in response to reception of the DFI.

Optionally, the communication unit 510 is further configured to transmit second information, where the second information is used to configure first parameter information, the first parameter information is used to determine a type of a first CG resource, and the first parameter information includes at least one of: a type-1 CG resource indication, a type-2 CG resource indication, or a CG retransmission timer.

Optionally, the first parameter information being used to determine the type of the first CG resource includes at least one of the following. The first parameter information is used to determine that the type of the first CG resource is the type-2 CG resource on condition that the first parameter information includes the CG retransmission timer. The first parameter information is used to determine that the type of the first CG resource is the type-1 CG resource on condition that the first parameter information includes no CG retransmission timer. The first parameter information is used to determine that the type of the first CG resource is the type-1 CG resource on condition that the first parameter information includes the type-1 CG resource indication. The first parameter information is used to determine that the type of the first CG resource is the type-2 CG resource on condition that the first parameter information includes no type-1 CG resource indication. The first parameter information is used to determine that the type of the first CG resource is the type-2 CG resource on condition that the first parameter information includes the type-2 CG resource indication. The first parameter information is used to determine that the type of the first CG resource is the type-1 CG resource on condition that the first parameter information includes no type-2 CG resource indication.

Optionally, a CG resource in an unlicensed frequency point is configured with the first parameter information. Optionally, the CG resource in the unlicensed frequency point is not configured with the first parameter information.

Optionally, on condition that one of at least one CG resource is configured with the first parameter information, the rest of the at least one CG resource is also configured with the first parameter information.

Optionally, on condition that one of at least one CG resource is configured with the first parameter information, the rest of the at least one CG resource is also configured with the first parameter information by default or uses the first parameter information.

Optionally, the first CG resource belongs to at least one CG resource configured by the network device.

Optionally, the communication unit 510 is further configured to transmit first configuration information, where the first configuration information is used to configure: both the type-1 CG resource and the type-2 CG resource, the type-1 CG resource, or the type-2 CG resource.

Optionally, the communication unit 510 is further configured to transmit a first indication, where the first indication indicates one of the following. The terminal device activates or uses the type-1 CG resource configured and the type-2 CG resource configured. The terminal device activates or uses the type-1 CG resource configured. The terminal device activates or uses the type-2 CG resource configured.

Optionally, the communication unit 510 is further configured to transmit a second indication, where the second indication indicates : both a scheme in which the terminal device activates or uses the type-1 CG resource configured and a scheme in which the terminal device activates or uses the type-2 CG resource configured, the scheme in which the terminal device activates or uses the type-1 CG resource configured, or the scheme in which the terminal device activates or uses the type-2 CG resource configured.

Optionally, the DFI is an ACK/NACK indication of all HARQ processes for a carrier, the DFI is an ACK/NACK indication of a CG HARQ process for a carrier, the DFI is an ACK/NACK indication of all HARQ processes, the DFI is an ACK/NACK indication of a CG HARQ process, the DFI is an ACK/NACK indication of an HARQ process for the type-2 CG resource, or the DFI is an ACK/NACK indication of an HARQ process for the type-2 CG resource for a carrier.

Optionally, the type-1 CG resource is a URLLC CG resource, and the type-2 CG resource is an NR-U CG resource.

Optionally, in some implementations, the communication unit may be a communication interface or a transceiver, or an input/output interface of a communication chip or an SOC. The processing unit may be one or more processors.

It can be understood that, according to implementations of the disclosure, the network device 500 can correspond to the network device in the method implementations of the disclosure, and the above-mentioned and other operations and/or functions of each unit in the network device 500 respectively implement a corresponding procedure performed by the network device in the method 300 illustrated in FIG. 3, which will not be repeated herein for sake of simplicity.

Figure 6:
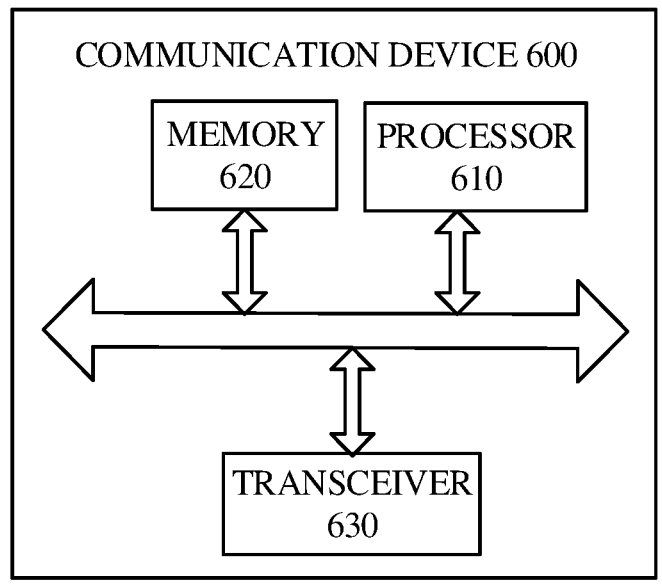
FIG. 6 is a schematic block diagram illustrating a communication device according to implementations of the disclosure.

FIG. 6 is a schematic structural diagram illustrating a communication device 600 according to implementations of the disclosure. As illustrated in FIG. 6, the communication device 600 includes a processor 610. The processor 610 is configured to invoke and execute computer programs stored in a memory, to perform the methods in the implementations of the disclosure.

Optionally, as illustrated in FIG. 6, the communication device 600 further includes a memory 620. The processor 610 is configured to invoke and execute computer programs stored in the memory 620, to perform the methods in the implementations of the disclosure.

The memory 620 may be a separate device from the processor 610, or be integrated into the processor 610.

Optionally, as illustrated in FIG. 6, the communication device 600 further includes a transceiver 630. The processor 610 can control the transceiver 630 to communicate with other devices. Specifically, the transceiver 630 can transmit information or data to other devices, or receive information or data transmitted by other devices.

The transceiver 630 may include a transmitter and a receiver, and further include one or more antennas.

Optionally, the communication device 600 may be the network device in the implementations of the disclosure, and the communication device 600 can implement a corresponding process implemented by the network device in each of the methods of the implementations of the disclosure, which will not be repeated herein for the sake of simplicity.

Optionally, the communication device 600 may specifically be the terminal device in the implementations of the disclosure, and the communication device 600 can implement a corresponding process implemented by the terminal device in each of the methods of the implementations of the disclosure, which will not be repeated herein for the sake of simplicity.

Figure 7:
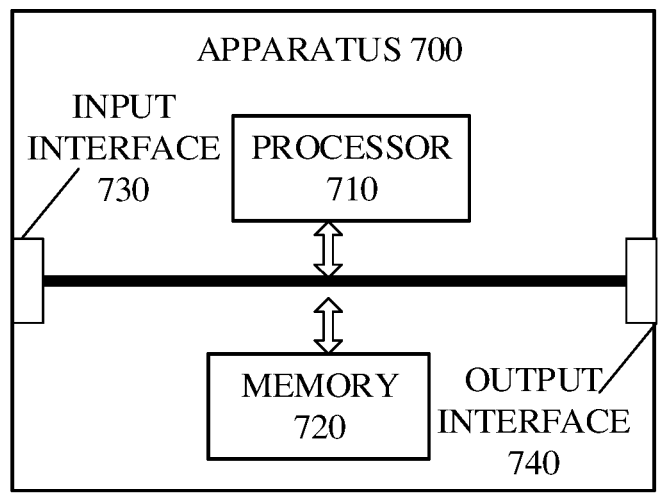
FIG. 7 is a schematic block diagram illustrating an apparatus according to implementations of the disclosure.

FIG. 7 is a schematic block diagram illustrating an apparatus according to implementations of the disclosure. As illustrated in FIG. 7, an apparatus 700 includes a processor 710. The processor 710 is configured to invoke and execute computer programs stored in a memory, to perform the methods in the implementations of the disclosure.

Optionally, as illustrated in FIG. 7, the apparatus 700 further includes a memory 720. The processor 710 is configured to invoke and execute computer programs stored in the memory 720, to perform the methods in the implementations of the disclosure.

The memory 720 may be a separate device from the processor 710, or be integrated into the processor 710.

Optionally, the apparatus 700 may further include an input interface 730. The processor 710 can control the input interface 730 to communicate with other devices or chips. Specifically, the input interface 730 can obtain information or data transmitted by other devices or chips.

Optionally, the apparatus 700 may further include an output interface 740. The processor 710 can control the output interface 740 to communicate with other devices or chips. Specifically, the output interface 740 can output information or data to other devices or chips.

Optionally, the apparatus can be applied to the network device in the implementations of the disclosure, and the apparatus can implement a corresponding process implemented by the network device in each of the methods in the implementations of the disclosure, which will not be repeated herein for the sake of simplicity.

Optionally, the apparatus can be applied to the terminal device in the implementations of the disclosure, and the apparatus can implement a corresponding process implemented by the terminal device in each of the methods in the implementations of the disclosure, which will not be repeated herein for the sake of simplicity.

It can be understood that, the apparatus mentioned in the implementations of the disclosure may also be called a chip such as a system-level chip, a system chip, a chip system, a system-on-a-chip chip, or the like.

Figure 8:
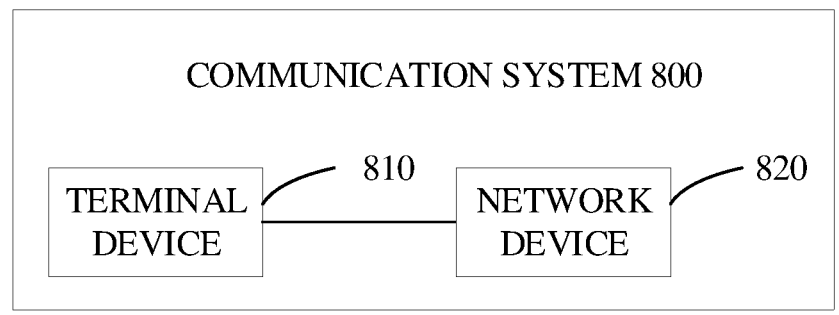
FIG. 8 is a schematic block diagram illustrating a communication system according to implementations of the disclosure.

FIG. 8 is a schematic block diagram illustrating a communication system 800 according to implementations of the disclosure. As illustrated in FIG. 8, the communication system 800 includes a terminal device 810 and a network device 820.

The terminal device 810 can be configured to implement a corresponding function implemented by the terminal device in the foregoing methods, and the network device 820 can be configured to implement a corresponding function implemented by the network device in the foregoing methods, which will not be repeated herein for the sake of simplicity.

It can be understood that, the processor in the implementations of the disclosure may be an integrated circuit chip with signal processing capabilities. During implementation, each step of the foregoing methods may be completed by an integrated logic circuit in the form of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in the implementations of the disclosure can be implemented or executed. The general purpose processor may be a microprocessor, or the processor may be any conventional processor or the like. The steps of the method disclosed in the implementations of the disclosure may be directly implemented as a hardware decoding processor, or may be performed by hardware and software modules in the decoding processor. The software module can be located in a storage medium such as a random access memory (RAM), a flash memory, a read only memory (ROM), a programmable read-only memory (PROM,) or an electrically erasable programmable memory, registers, and the like. The storage medium is located in the memory. The processor reads the information in the memory, and completes the steps of the above-mentioned method with the hardware thereof.

It can be understood that, in implementations of the disclosure, the memory may be a volatile memory or a non-volatile memory, or may include both the volatile memory and the non-volatile memory. The non-volatile memory may be an ROM, a PROM, an erasable programmable read-only memory (EPROM), an electrically erasable programmable read-only memory (EEPROM), or a flash memory. The volatile memory can be an RAM that acts as an external cache. By way of example but not limitation, many forms of RAM are available, such as a static random access memory (SRAM), a dynamic random access memory (DRAM), a synchronous dynamic random access memory (SDRAM), a double data rate SDRAM (DDRSDRAM), an enhanced SDRAM (ESDRAM), a synclink dynamic random access memory (SLDRAM), and a direct rambus random access memory (DRRAM).

It can be understood that, the above-mentioned memory is an example but not limitation. For example, the memory may be an SRAM, a DRAM, an SDRAM, a DDRSDRAM, an ESDRAM, an SLDRAM, and a DRRAM. That is to say, the memory described herein is intended to include, but is not limited to, these and any other suitable types of memory.

A computer-readable storage medium is further provided in implementations of the disclosure. The computer-readable storage medium is configured to store computer programs.

Optionally, the computer-readable storage medium may be applied to the network device in implementations of the disclosure, and the computer programs enable a computer to perform a corresponding process implemented by the network device in each of the methods in implementations of the disclosure, which will not be repeated herein for the sake of simplicity.

Optionally, the computer-readable storage medium may be applied to the terminal device in implementations of the disclosure, and the computer programs enable a computer to perform a corresponding process implemented by the terminal device in each of methods in implementations of the disclosure, which will not be repeated herein for the sake of simplicity.

A computer program product is further provided in implementations of the disclosure. The computer program product includes computer program instructions.

Optionally, the computer program product may be applied to the network device in implementations of the disclosure, and the computer programs enable a computer to perform a corresponding process implemented by the network device in each of the methods in implementations of the disclosure, which will not be repeated herein for the sake of simplicity.

Optionally, the computer program product may be applied to the terminal device in implementations of the disclosure, and the computer programs enable a computer to perform a corresponding process implemented by the terminal device in each of methods in implementations of the disclosure, which will not be repeated herein for the sake of simplicity.

A computer program is further provided in implementations of the disclosure.

Optionally, the computer program may be applied to the network device in implementations of the disclosure, and the computer program, when running on a computer, enables the computer to perform a corresponding process implemented by the network device in each of the methods in implementations of the disclosure, which will not be repeated herein for the sake of simplicity.

Optionally, the computer program may be applied to the terminal device in implementations of the disclosure, and the computer program, when running on a computer, enables the computer to perform a corresponding process implemented by the terminal device in each of the methods in implementations of the disclosure, which will not be repeated herein for the sake of simplicity.

Those of ordinary skill in the art can appreciate that units and algorithmic operations of various examples described in connection with the implementations herein can be implemented by electronic hardware or by a combination of computer software and electronic hardware. Whether these functions are performed by means of hardware or software depends on particular application and design constraints of the technical solution. Those skilled in the art may use different methods with regard to each particular application to implement the described functionality, but such methods should not be regarded as lying beyond the scope of the disclosure.

It may be evident to those skilled in the art that, for the sake of convenience and simplicity, in terms of the working processes of the foregoing systems, apparatuses, and units, reference can be made to the corresponding processes of the above-mentioned method implementations, which will not be repeated herein.

It may be appreciated that the systems, apparatuses, and methods disclosed in the implementations herein may also be implemented in various other manners. For example, the above-mentioned apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components or parts displayed as units may or may not be physical units, and may reside at one location or may be distributed to multiple networked units. Some of or all the units may be selectively adopted according to practical needs to achieve desired objectives of the disclosure.

Various functional units described in the implementations herein may be integrated into one processing unit or may be present as a number of physically separated units, and two or more units may be integrated into one.

If the functions are implemented as software functional units and sold or used as SA products, they may be stored in a computer-readable storage medium. Based on such an understanding, the technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in the implementations of the disclosure. The above-mentioned storage medium may include various kinds of medium that can store program codes, such as a universal serial bus (USB) flash disk, a mobile hard drive, an ROM, an RAM, a magnetic disk, or an optical disk.

The above is only a specific implementation of the disclosure and is not intended to limit the scope of protection of the disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for using configured grant (CG) resources, comprising:
in response to reception of downlink feedback information (DFI):
for a type-2 CG resource, using, by a terminal device, the DFI; and
for a type-1 CG resource, ignoring, by the terminal device, the DFI;
wherein the method further comprises:
determining, by the terminal device, a type of a first CG resource according to first parameter information, wherein the first parameter information comprises a CG retransmission timer;

wherein determining, by the terminal device, the type of the first CG resource according to the first parameter information comprises:
determining, by the terminal device, that the type of the first CG resource is the type-2 CG resource on condition that the first parameter information comprises the CG retransmission timer; and
determining, by the terminal device, that the type of the first CG resource is the type-1 CG resource on condition that the first parameter information comprises no CG retransmission timer.

2. The method of claim 1, wherein
a CG resource in an unlicensed frequency point is not configured with the first parameter information.

3. The method of claim 1, wherein
on condition that one of at least one CG resource is configured with the first parameter information, each remaining CG resource of the at least one CG resource is also configured with the first parameter information.

4. The method of claim 1, wherein
the first CG resource belongs to at least one CG resource configured by a network device.

5. The method of claim 1, further comprising:
receiving, by the terminal device, first configuration information, wherein the first configuration information is used to configure the type-2 CG resource.

6. The method of claim 1, wherein
the DFI is an acknowledgement/negative acknowledgement (ACK/NACK) indication of all hybrid automatic repeat request (HARQ) processes for a carrier.

7. The method of claim 1, wherein the type-2 CG resource is a new-radio unlicensed (NR-U) CG resource.

8. A terminal device comprising:
a processor; and
a memory storing a computer program which, when executed by the processor, causes the processor to:
use, for a type-2 CG resource, downlink feedback information (DFI) in response to reception of the DFI; and
ignore, for a type-1 CG resource, the DFI in response to reception of the DFI;
wherein the computer program is further executed by the processor to cause the processor to determine a type of a first CG resource according to first parameter information, wherein the first parameter information comprises a CG retransmission timer;
wherein the computer program executed by the processor to cause the processor to determine the type of the first CG resource according to the first parameter information is executed by the processor to cause the processor to determine that the type of the first CG resource is the type-2 CG resource on condition that the first parameter information comprises the CG retransmission timer, and determine that the type of the first CG resource is the type-1 CG resource on condition that the first parameter information comprises no CG retransmission timer.

9. The terminal device of claim 8, wherein
a CG resource in an unlicensed frequency point is not configured with the first parameter information.

10. The terminal device of claim 8, wherein
on condition that one of at least one CG resource is configured with the first parameter information, each remaining CG resource of the at least one CG resource is also configured with the first parameter information.

11. The terminal device of claim 8, wherein
the first CG resource belongs to at least one CG resource configured by a network device.

12. The terminal device of claim 8, further comprising a transceiver, wherein
the computer program is further executed by the processor to cause the transceiver to receive first configuration information, wherein the first configuration information is used to configure the type-2 CG resource.

13. The terminal device of claim 8, wherein
the DFI is an acknowledgement/negative acknowledgement (ACK/NACK) indication of all hybrid automatic repeat request (HARQ) processes for a carrier.

14. The terminal device of claim 8, wherein the type-2 CG resource is a new-radio unlicensed (NR-U) CG resource.

15. A network device, comprising:
a transceiver;
a processor; and
a memory storing a computer program which, when executed by the processor, causes the transceiver to:
transmit first information, the first information indicating:
for a type-2 CG resource, a terminal device using downlink feedback information (DFI) in response to reception of the DFI; and
for a type-1 CG resource, the terminal device ignoring the DFI in response to reception of the DFI;
wherein the computer program is further executed by the processor to cause the transceiver to transmit second information, wherein the second information is used to configure first parameter information, the first parameter information is used to determine a type of a first CG resource, and the first parameter information comprises a CG retransmission timer;
wherein the first parameter information being used to determine the type of the first CG resource comprises: the first parameter information being used to determine that the type of the first CG resource is the type-2 CG resource on condition that the first parameter information comprises the CG retransmission timer, and determine that the type of the first CG resource is the type-1 CG resource on condition that the first parameter information comprises no CG retransmission timer.

* * * * *